UNITED STATES PATENT OFFICE.

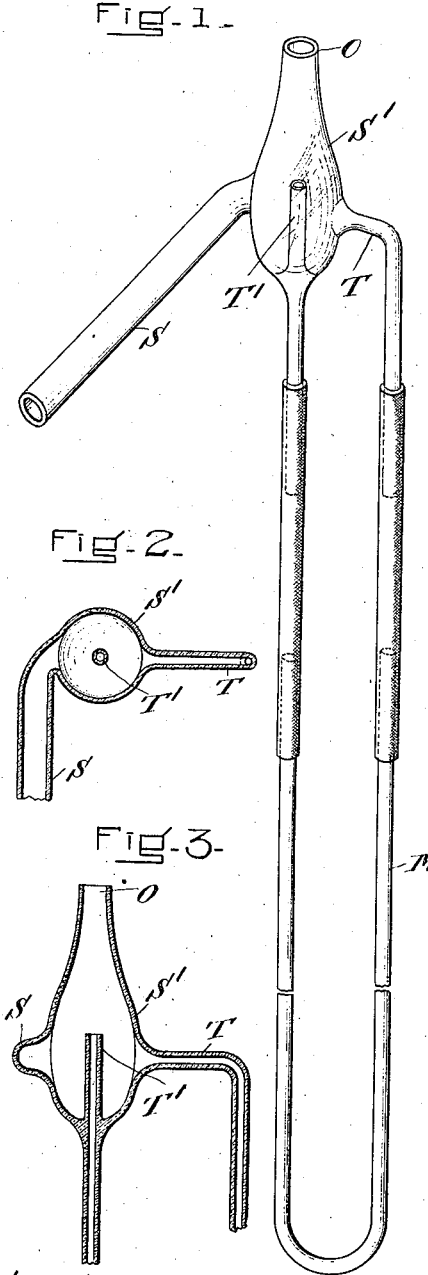

HARVEY C. HAYES, OF CAMBRIDGE, MASSACHUSETTS, ASSIGNOR OF FORTY-NINE ONE-HUNDREDTHS TO EDWIN W. NICK, OF ERIE, PENNSYLVANIA.

FLUID-METER.

1,141,631.  Specification of Letters Patent.  Patented June 1, 1915.

Application filed March 21, 1913. Serial No. 755,959.

*To all whom it may concern:*

Be it known that I, HARVEY C. HAYES, a citizen of the United States, and resident of Cambridge, in the county of Middlesex and State of Massachusetts, have invented new and useful Improvements in Fluid-Meters, of which the following is a specification.

My invention relates to measuring instruments, *i. e.* meters, for ascertaining and measuring the characteristics of moving fluids, particularly the velocity of flow, and density of such fluids in motion, and consists in novel apparatus of this general character.

By my invention herein described highly sensitive and accurate apparatus for measuring rate of flow, and density of flowing fluids, is provided. The miscellaneous uses of my apparatus will be described or suggested herein.

In the drawings hereto annexed which represent examples of my invention,—Figure 1 is a perspective view of a simple form of apparatus; Fig. 2 is a horizontal section of Fig. 1, taken through the pressure tap T'; and Fig. 3 is a section of Fig. 1, taken through the pressure tap T', longitudinally.

The meter illustrated in the drawings is adapted to form part of a conduit through which fluid flows. The tube S leads the fluid to the meter, and enters the vortex chamber S' obliquely, or as nearly tangentially as structural limitations will allow. In flowing through the chamber S', the fluid is thus whirled, forming a vortex. In the form of meter illustrated in the drawings, the outlet from the chamber S' is at the end of the chamber, at O. With this arrangement the movement of fluid through the chamber S' will be a spiral vortex. At or near the axis of the vortex produced by flow of fluid a pressure tap T' is placed, this being a tube with its opening toward the outlet O, and communicating with one branch of the manometer M.

The pressure tap T is radially external to the pressure tap T' and preferably is formed in the wall of the vortex chamber S' in nearly the same plane—transversely of the chamber, as the opening of the pressure tap T'. The tap T is connected with the other branch of the manometer M, which constitutes means to determine the difference in fluid pressure at the two taps.

When fluid flows through the chamber S' from inlet S to outlet O, it forms a vortex about the pressure tap T' and as the vortex is spiral, flowing toward the outlet O, the fluid streams past the pressure tap T' as well as rotates about it. Thus there are produced two factors which affect the pressure at the orifice of the pressure tap T', the centrifugal factor which tends to lower the pressure, and the aspirating effect of flow past the orifice of the tap T' toward the outlet O. At the tap T, the centrifugal effect produces a rise of pressure, while both factors, centrifugal and aspirative, lower the pressure at tap T'. The pressure at T' may fall below atmospheric pressure, while that at the tap T may rise considerably above the pressure of fluid as measured normally to the side of the inlet pipe S. In a meter of this character, a flow of water at the rate of five feet per second has produced a difference in level of twenty feet in a water manometer. Since the difference in pressures at the central and peripheral taps respectively is so high, even with a moderate rate of flow in the meter itself, it follows that the meter is highly sensitive, and susceptible of great accuracy.

In using such a meter, the characteristics of a fluid under observation are velocity and density, and either may be deduced from the other by means of such a meter as above described.

The conditions of observation and performance may be so controlled that either the density or velocity is a known or determined quantity, in other words, the apparatus and its functionally contributory environment may be so managed that one of the two factors, both of which, generally speaking, are variable, becomes a constant. Thus, if the density be predetermined, as by the admission of but one gas at constant temperature, to the meter, its velocity is at once determinable from the pressure differential. Or, if the conditions of employment of the meter are qualified by substantially constant velocity, variations in density can be likewise determined. This, for instance, might well be the case with flue-gases, which flow at a very nearly uniform rate and present but slight temperature fluctuations, but which vary in content of $CO_2$. Variation of this kind produces variations in density; the pressure differential at the meter serves to determine the density fluctuations, and these furnish means to ascertain the proportion of $CO_2$ in the flue gases. Or, the flow of fluid may be quantitatively measured by my method without imposing a constant value on either of the characteristics of velocity or density, but allowing fluctuations in both to occur as they may. Thus, suppose illuminating gas is to be paid for according to a standard of volume and density, say a density corresponding to pressure of two ounces to the square inch in excess of atmospheric pressure. The gas supply from the main will vary from this standard, and both velocity and density of gas passing through a meter will fluctuate. By periodically noting the differential in pressure indicated by the meter hereinabove described, a curve may be plotted which, by comparison with a standard of reference, such as the velocity produced by gas of standard density, represents the volume delivered in terms of standard density. Paying by the record of such a meter the consumer will be charged for exactly what he received, namely, the equivalent of so many thousand cubic feet of gas at standard density, instead of being charged, as now, with so many thousand cubic feet of gas, without respect to density.

I claim:

1. In a fluid meter, a chamber having an inlet and outlet for fluid to be measured, arranged to whirl the fluid in a spiral vortex in transit through the chamber, pressure taps from the chamber, one near the vortex center with its aperture pointing in the axial direction of spiral flow, the other near the periphery of the vortex, and means to determine the difference in fluid pressure at the taps.

2. In a fluid meter, a vortex chamber, a tangential inlet and axial outlet therefor, and pressure taps from the vortex chamber, one nearer the center of the vortex than the other, and means to determine the difference of fluid pressure at the taps.

3. In a fluid meter, a vortex chamber, an inlet and outlet therefor, a pressure tap at the axis of the vortex chamber and opening toward the outlet, and another pressure tap near the periphery of the vortex, and means to determine the difference of fluid pressure at the taps.

4. In a fluid meter, a vortex chamber, a tangential inlet and axial outlet therefor, a pressure tap at the axis of the vortex chamber and opening toward the outlet, and another pressure tap near the periphery of the vortex, and means to determine the difference of fluid pressure at the taps.

Signed by me at Boston, Massachusetts, this twenty-sixth day of February, 1913.

HARVEY C. HAYES.

Witnesses:
ODIN ROBERTS,
JOSEPHINE H. RYAN.